(12) United States Patent
Dailey

(10) Patent No.: US 6,393,655 B1
(45) Date of Patent: May 28, 2002

(54) RUBBER PRODUCTS HAVING BETTER ABRASION RESISTANCE

(75) Inventor: Larry Roger Dailey, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/255,068

(22) Filed: Feb. 22, 1999

Related U.S. Application Data

(60) Provisional application No. 60/075,521, filed on Feb. 23, 1998.

(51) Int. Cl.$^7$ .................................................. B60S 1/02
(52) U.S. Cl. .................... 15/250.48; 524/458; 524/836; 526/65
(58) Field of Search ................................ 524/458, 836; 526/65; 15/250.48

(56) References Cited

U.S. PATENT DOCUMENTS

| | | | | |
|---|---|---|---|---|
| 4,045,838 A | * | 9/1977 | Porter | 15/250.36 |
| 4,669,144 A | * | 6/1987 | Yasukawa et al. | 15/250.36 |
| 5,583,173 A | | 12/1996 | Gujarathi et al. | 524/458 |

OTHER PUBLICATIONS

The Vanderbilt Rubber Handbook, George G. Winspear (Editor) R T Vanderbilt Company, Inc (1968) at pp. 34–57.

* cited by examiner

Primary Examiner—Peter D. Mulcahy
(74) Attorney, Agent, or Firm—Alvin T. Rockhill

(57) ABSTRACT

This invention is based upon the unexpected discovery that the physical properties of rubber products made with styrene-butadiene rubber can be significantly improved by synthesizing the styrene-butadiene rubber by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex. For example, improved abrasion resistance, compression set and tensile strength can be attained. These improved physical properties offer advantages in a wide variety of rubber products, such as windshield wiper blades, brake diaphragms, washers, seals, gaskets, tires, hoses, conveyor belts, power transmission belts, shoe soles, shoe foxing and floor mats for buildings or automotive applications.

21 Claims, 1 Drawing Sheet

RUBBER PRODUCTS HAVING BETTER ABRASION RESISTANCE

This application claims the benefit of U.S. Provisional Application No. 60/075,521 filed Feb. 23, 1998.

BACKGROUND OF THE INVENTION

A wide variety of rubber products are made with styrene-butadiene rubber (SBR). For instance, large quantities of SBR are utilized in manufacturing tires for automobiles, trucks, aircraft and other types of vehicles. SBR is commonly used in manufacturing tires because it generally improves traction characteristics. The physical properties that SBR offers are also attractive for use in windshield wiper blades, brake diaphragms, washers, seals, gaskets, hoses, conveyor belts, power transmission belts, floor mats and shoe soles and foxing.

SBR can be synthesized by utilizing emulsion polymerization techniques. Typical emulsion systems employed in the synthesis of SBR contain water, an emulsifier (soap), a free radical generator, styrene monomer and 1,3-butadiene monomer. For example, in free radical emulsion polymerization systems, radicals can be generated by the decomposition of peroxides or peroxydisulfides.

Commonly employed initiators include t-butyl hydroperoxide, pinane hydroperoxide, para-menthane hydroperoxide, potassium peroxydisulfate ($K_2S_2O_8$), benzoyl peroxide, cumene hydroperoxide and azobisisobutyronitrile (AIBN). These compounds are thermally unstable and decompose at a moderate rate to release free radicals. The combination of potassium peroxydisulfate with a mercaptan such as dodecyl mercaptan is commonly used to polymerize butadiene and SBR. In hot recipes, the mercaptan has the dual function of furnishing free radicals through reaction with the peroxydisulfate and also of limiting the molecular weight of polymer by reacting with one growing chain to terminate it and to initiate growth of another chain. This use of mercaptan as a chain transfer agent or modifier is of great commercial importance in the manufacture of SBR in emulsion since it allows control of the toughness of the rubber which otherwise may limit processibility in the factory.

A standard polymerization recipe agreed on for industrial use is known as the "mutual," "standard," "GR-S" or "hot" recipe. This standard polymerization recipe contains the following ingredients (based upon parts by weight): 75.0 parts of 1,3-butadiene, 25 parts of styrene, 0.5 parts of n-dodecyl mercaptan, 0.3 parts of potassium peroxydisulfate, 5.0 parts of soap flakes and 180.0 parts of water.

When this standard recipe is employed in conjunction with a polymerization temperature of 50° C., the rate of conversion to polymer occurs at 5–6 percent per hour. Polymerization is terminated at 70–75 percent conversion since high conversions led to polymers with inferior physical properties, presumably because of crosslinking in the latex particle to form microgel or highly branched structures. This termination is effected by the addition of a "shortstop" such as hydroquinone (about 0.1 part by weight) which reacts rapidly with radicals and oxidizing agents. Thus, the shortstop destroys any remaining initiator and also reacts with polymer-free radicals to prevent formation of new chains. The unreacted monomers are then removed; first, the butadiene by flash distillation at atmospheric pressure, followed by reduced pressure and then the styrene by steam-stripping in a column.

A dispersion of antioxidant, such as N-phenyl-β-naphthylamine (PBNA) is typically added (1.25 parts) to protect the SBR from oxidation. The latex can then be partially coagulated (creamed) by the addition of brine and then fully coagulated with dilute sulfuric acid or aluminum sulfate. The coagulated crumb is then washed, dried and baled for shipment. One of the first major improvements on the basic process was the adoption of continuous processing. In such a continuous process, the styrene, butadiene, soap, initiator and activator (an auxiliary initiating agent) are pumped continuously from storage tanks into and through a series of agitated reactors maintained at the proper temperature at a rate such that the desired degree of conversion is reached at the exit of the last reactor. Shortstop is then added, the latex is warmed by the addition of steam and the unreacted butadiene is flashed off. Excess styrene is then steam-stripped off and the latex is finished, often by blending with oil, creaming, coagulating, drying and bailing.

For further details on SBR and the "standard recipe," see The Vanderbilt Rubber Handbook, George G Winspear (Editor), R T Vanderbilt Company, Inc (1968) at pages 34–57.

U.S. Pat. No. 5,583,173 discloses a process for preparing a latex of styrene-butadiene rubber which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber.

By employing the technique disclosed in U.S. Pat. No. 5,583,173, the amount of soap required to produce styrene-butadiene rubber by emulsion polymerization can be reduced by greater than 30 percent. This is advantageous because it reduces costs and is environmentally attractive. U.S. Pat. No. 5,583,173 also reports that the styrene-butadiene rubber produced by the process described therein offers advantages in that it contains lower quantities of residual soap. This reduces fatty acid bloom characteristics in final products, such as tires, and makes plies easier to adhere together during building procedures.

SUMMARY OF THE INVENTION

This invention is based upon the unexpected discovery that the physical properties of rubber products made with styrene-butadiene rubber can be significantly improved by synthesizing the styrene-butadiene rubber by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex. For example, improved abrasion resistance, compression set and tensile strength can be attained. These improved physical properties offer advantages in a wide variety of rubber products, such as windshield wiper blades, brake diaphragms, washers, seals, gaskets, tires, hoses, conveyor belts, power transmission belts, floor mats, shoe soles, shoe foxing, tank track pads, tank bogey wheel treads, dock fenders, armor plating and skirt boards.

This invention more specifically discloses a windshield wiper blade having improved abrasion resistance which is comprised of styrene-butadiene rubber wherein the styrene-butadiene rubber is made by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex.

The present invention also discloses a brake diaphragm having improved durability which is comprised of (I) styrene-butadiene rubber and (II) 45 phr to 75 phr of a filler; wherein the styrene-butadiene rubber is made by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex.

The subject invention further reveals a sole for shoes or boots having improved durability which is comprised of (I) styrene-butadiene rubber and (II) 45 phr to 150 phr of a filler; wherein the styrene-butadiene rubber is made by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex.

The present invention additionally discloses a floor mat having improved durability which is comprised of (I) styrene-butadiene rubber and (II) 50 phr to 300 phr of a filler; wherein the styrene-butadiene rubber is made by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex.

The subject invention also reveals a gasket having improved resistance to compression set which is comprised of (I) styrene-butadiene rubber and (II) 30 phr to 70 phr of a filler; wherein the styrene-butadiene rubber is made by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex.

The present invention further discloses a washer having improved resistance to compression set which is comprised of (I) styrene-butadiene rubber and (II) 30 phr to 70 phr of a filler; wherein the styrene-butadiene rubber is made by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex.

The subject invention also discloses a bogey wheel tread for tanks or armored personnel carriers having improved durability which is comprised of (I) styrene-butadiene rubber and (II) 40 phr to 80 phr of a filler; wherein the styrene-butadiene rubber is made by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex.

The present invention further discloses a tank track pad having improved durability which is comprised of (I) styrene-butadiene rubber and (II) 40 phr to 80 phr of a filler;.wherein the styrene-butadiene rubber is made by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex.

The present invention further discloses a dock fender having improved durability which is comprised of (I) styrene-butadiene rubber and (II) 40 phr to 80 phr of a filler; wherein the styrene-butadiene rubber is made by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex.

The subject invention additionally reveals a belt having improved durability which is comprised of (I) styrene-butadiene rubber and (II) 40 phr to 80 phr of a filler; wherein the styrene-butadiene rubber is made by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex.

DETAILED DESCRIPTION OF THE INVENTION

Figure 1:
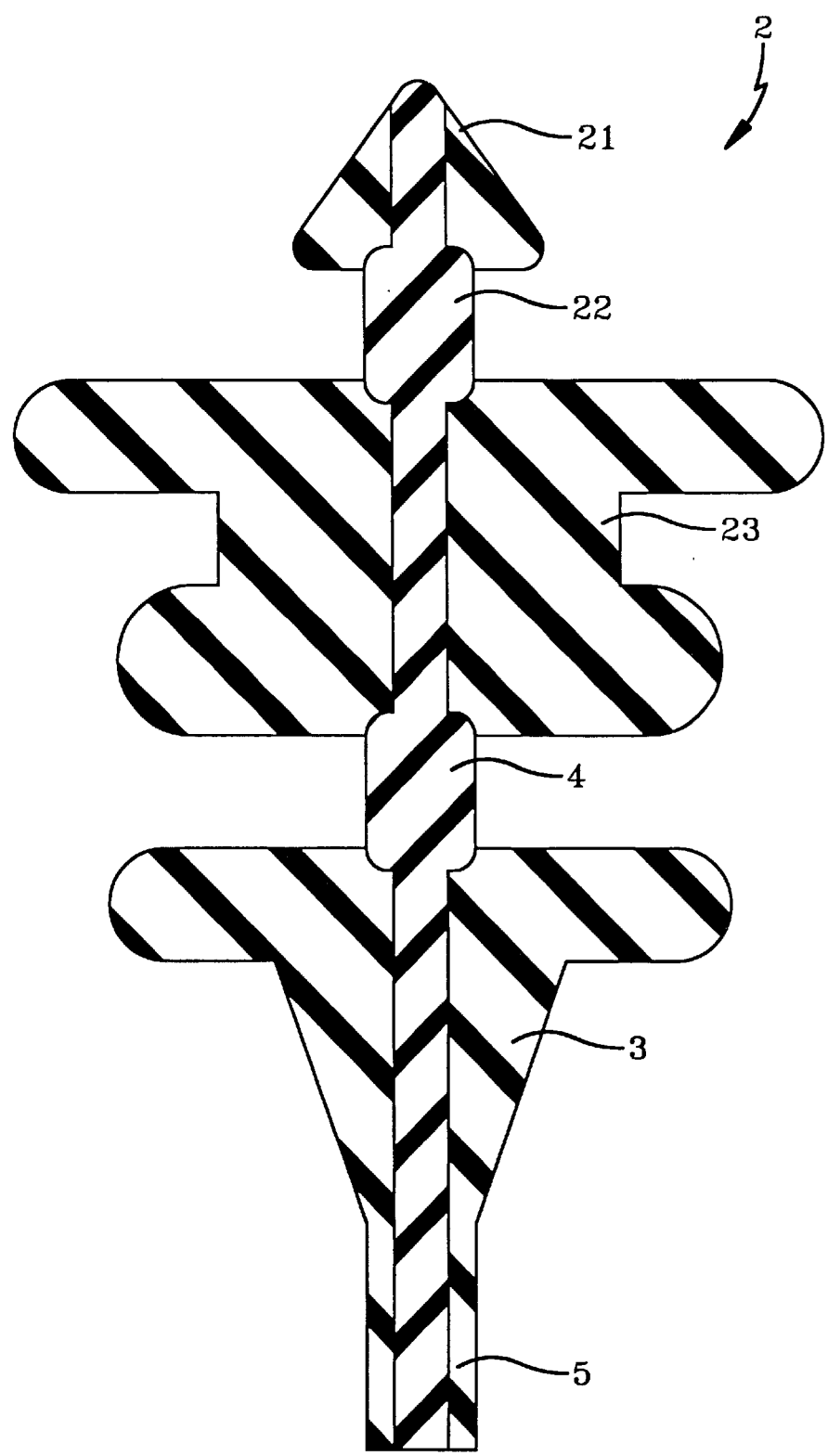
FIG. 1 is a sectional view of a windshield wiper blade that represents a preferred embodiment of this invention.

The styrene-butadiene rubber latex utilized in manufacturing the rubber products of this invention is synthesized utilizing the free radical emulsion polymerization technique described in U.S. Pat. No. 5,583,173. This polymerization technique is known as the FIM process (feed-injection-monomer) and is carried out by adding a styrene monomer, 1,3-butadiene monomer, water, a free radical generator and a soap system to a first polymerization zone to form an aqueous polymerization medium. The first polymerization zone will normally be a reactor or series of two or more reactors. Copolymerization of the monomers is initiated with the free radical generator. This copolymerization reaction results in the formation of a low conversion polymerization medium.

At the point where the low conversion polymerization medium reaches a monomer conversion which is within the range of about 15 percent to about 40 percent, the low conversion polymerization medium is charged into a second polymerization zone. The second polymerization zone can be a reactor or a series of two or more reactors. The low conversion polymerization medium will normally be charged into the second polymerization zone at a monomer conversion level which is within the range of about 17 percent to about 35 percent. It will more preferably be charged into the second polymerization zone at a level of monomer conversion which is within the range of 20 percent to 30 percent.

Additional styrene monomer and butadiene monomer are charged into the second polymerization zone. Normally, from about 20 percent to about 50 percent of the total amount of styrene monomer and 1,3-butadiene monomer will be charged into the second polymerization zone (from 50 percent to 80 percent of the total monomers are charged into the first polymerization zone). It is normally preferred to charge from about 30 weight percent to about 45 weight percent of the total quantity of monomers charged into the second polymerization zone (from 55 percent to 70 percent of the total monomers charged will be charged into the first polymerization zone). It is generally most preferred to charge from about 35 weight percent to about 42 weight percent of the total quantity of monomers charged into the second polymerization zone (from 58 percent to 65 percent of the total monomers charged will be charged into the first polymerization zone). By splitting the monomer charge between the first polymerization zone and the second polymerization zone, the total quantity of soap required to provide a stable latex is reduced by at least about 30 percent.

The copolymerization in the second polymerization zone is allowed to continue until a monomer conversion of at least 50 percent is attained. The copolymerization will preferably be allowed to continue until a total monomer conversion which is within the range of 50 percent to 68 percent is realized. More preferable, the copolymerization in the second reaction zone will be allowed to continue until a monomer conversion of 58 percent to 65 percent is reached.

After the desired monomer conversion is reached in the second polymerization zone, the SBR latex made is removed from the second polymerization zone and a short stop is added to terminate the copolymerization. After the copolymerization has been completed and the shortstop has been added to the latex, the SBR can be recovered from the latex by using standard coagulation and drying techniques.

In synthesizing the SBR latex, generally from about 10 weight percent to about 40 weight percent styrene and from about 60 weight percent to about 90 weight percent 1,3-butadiene are copolymerized. It is typically preferred for the SBR to contain from about 20 weight percent to about 30 weight percent styrene and from about 70 weight percent to about 80 weight percent 1,3-butadiene. It is normally most preferred for the SBR to contain from about 24 weight percent to about 28 weight percent styrene and from about 72 weight percent to about 76 weight percent 1,3-butadiene. Like ratios of styrene, monomer and butadiene monomer will accordingly be charged into the first polymerization zone and the second polymerization zone.

Essentially any type of free radical generator can be used to initiate such free radical emulsion polymerizations. For example, free radical generating chemical compounds, ultra-violet light or radiation can be used. In order to ensure a satisfactory polymerization rate, uniformity and a controllable polymerization, free radical generating chemical agents which re water or oil-soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl, peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2bis-(t-butylperoxy)butane, ethyl 3,3-bis(t-butylperoxy)butyrate, 1,1-di-(t-butylperoxy) cyclohexane, and the like. Persulfate initiators, such as potassium persulfate and ammonium persulfate, are especially useful in such aqueous emulsion polymerizations.

The amount of initiator employed will vary with the desired molecular weight of the SBR being synthesized. Higher molecular weights are achieved by utilizing smaller quantities of the initiator and lower molecular weights are attained by employing larger quantities of the initiator. However, as a general rule, from 0.005 to 1 phm (parts by weight per 100 parts by weight of monomer) of the initiator will be included in the reaction mixture. In the case of metal persulfate initiators, typically from 0.1 phm to 0.5 phm of the initiator will be employed in the polymerization medium.

The soap systems used in the emulsion polymerization process contain a combination of rosin acid and fatty acid emulsifiers. The weight ratio of fatty acid soaps to rosin acid soaps will be within the range of about 50:50 to 90:10. It is normally preferred for the weight ratio of fatty acid soaps to rosin acid soaps to be within the range of 60:40 to 85:15. It is normally more preferred for the weight ratio of fatty acid soaps to rosin acid soaps to be within the range of 75:25 to 82:18. All of the soap is charged into the first polymerization zone. The total amount of soap employed will be less than 3.5 phm. The quantity of soap employed will normally be within the range of about 2.5 phm to 3.2 phm. It is typically preferred to utilize a level of soap which is within the range of about 2.6 phm to about 3.0 phm. In most cases, it will be most preferred to use an amount of the soap system which is within the range of about 2.7 phm to 2.9 phm. The precise amount of the soap system required in order to attain optimal results will, of course, vary with the specific soap system being used. However, persons skilled in the art will be able to easily ascertain the specific amount of soap system required in order to attain optimal results.

The free radical emulsion polymerization will typically be conducted at a temperature which is within the range of about 35° F. to about 65° F. It is generally preferred for the polymerization to be carried out at a temperature which is within the range of 40° F. to about 60° F. It is typically more preferred to utilize a polymerization temperature which is within the range of about 45° F. to about 55° F. To increase conversion levels, it can be advantageous to increase the temperature as the polymerization proceeds.

SBR made by this process (the FIM process) can be employed in manufacturing a wide variety of rubber articles having improved performance characteristics. These rubber products include windshield wiper blades, brake diaphragms, washers, seals, gaskets, tires, hoses, conveyor belts, power transmission belts, floor mats, shoe soles, shoe foxing, tank track pads, tank bogey wheel treads, dock fenders, armor plating and skirt boards. As a general rule, the SBR made by the FIM process is simply substituted for conventional SBR that is typically used in such applications with standard compounding and manufacturing procedures being employed.

Tank track pads, bogey wheel treads for tanks and armored personnel carriers and dock fenders that are manufactured utilizing SBR made by the FIM process offer improved abrasion resistance. In these types of applications, improved abrasion resistance greatly improves that durability of the rubber article. In these applications, the SBR is typically compounded with 40 to 80 phr (parts per 100 parts of rubber) of a filler, such as carbon black, 5 to 10 phr of an aromatic oil, 3 to 7 phr of zinc oxide, 1 to 2 phr of an antioxidant, 1 to 1.5 phr of a sulfenamide accelerator and 0.5 to 1 phr of a diphenyl guanidine secondary accelerator. It is normally preferred to utilize from 50 to 70 phr of the filler and 4 to 6 phr of zinc oxide. It is typically most preferred to include 55 to 65 phr of the filler.

Conveyor belts and power transmission belts can be manufactured utilizing from 60 to 100 percent SBR (made by the FIM process) as the rubber component. Such belts offer the advantage of greatly improved abrasion resistance. However, it is normally advantageous to include from about 10 to 40 parts by weight of natural rubber or synthetic polyisoprene with from 60 to 90 parts of the SBR. It is normally preferred to utilize a blend of about 25 to 35 parts by weight of natural rubber or synthetic polyisoprene with from 65 to 75 parts of the SBR in manufacturing conveyor belts or power transmission belts. In belts, the SBR containing blend is typically compounded with 40 to 80 phr (parts per 100 parts of rubber) of a filler, such as carbon black, 12 to 20 phr of an aromatic oil, 1 to 5 phr of zinc oxide, 1 to 2 phr of an antioxidant, 1 to 1.5 phr of a sulfenamide accelerator and 0.1 to 0.3 phr of a thiuram accelerator, such as tetramethylthiuram disulfide or tetraethylthiuram disulfide. It is normally preferred to utilize from 50 to 70 phr of the filler and 2 to 4 phr of zinc oxide. It is typically most preferred to include 55 to 65 phr of the filler.

Shoe soles can be manufactured utilizing from 60 to 100 percent SBR (made by the FIM process) as the rubber component. However, it is generally advantageous to blend some nitrile rubber with the SBR to attain improved oil resistance. For instance, the blend can contain 60 phr to 80 phr of the SBR and 20 phr to 40 phr of nitrile rubber. It is sometimes advantageous to include a small amount of natural rubber or synthetic polyisoprene to improve cut and chip resistance (toughness). For example, the shoe sole can be comprised of 60 phr to 80 phr of the SBR, 15 phr to 25 phr of nitrile rubber and 5 to 15 phr of natural rubber or synthetic polyisoprene. The shoe sole rubber composition will also typically contain 45 phr to 150 phr of a filler, such as clay or carbon black, zinc oxide, an antioxidant and optionally a colorant. The shoe sole rubber will normally be sulfur-cured utilizing a conventional sulfur cure package.

Floor mats having improved durability and improved resistance to compression set can also be made using the technique of this invention. Floor mats for automotive applications or for use in buildings can be manufactured utilizing from 60 to 100 percent SBR (made by the FIM process) as the rubber component. However, it is generally advantageous to blend some nitrile rubber with the SBR to attain improved oil resistance. For instance, the blend can contain 60 phr to 80 phr of the SBR and 20 phr to 40 phr of nitrile rubber. It is sometimes advantageous to include a small amount of natural rubber or synthetic polyisoprene to improve cut and chip resistance (toughness). For example, the floor mat can be comprised of 60 phr to 80 phr of the SBR, 15 phr to 25 phr of nitrile rubber and 5 to 15 phr of natural rubber or synthetic polyisoprene. The floor mat rubber composition will also typically contain from 50 phr to 300 phr of a filler, such as clay or carbon black, zinc oxide, an antioxidant and optionally a colorant. The floor mat rubber will normally be sulfur-cured utilizing a conventional sulfur cure package.

Washers and gaskets having improved resistance to compression set can also be made using the technique of this invention. Washers and gaskets can be manufactured utilizing from 70 to 100 percent SBR (made by the FIM process) as the rubber component. However, it is generally advantageous to blend some nitrile rubber and/or polybutadiene rubber with the SBR. For instance, nitrile rubber can be added to attain improved oil resistance. For example, the blend can contain 70 phr to 100 phr of the SBR and 0 phr to 30 phr of nitrile rubber and/or polybutadiene rubber. The washer or gasket rubber composition will also typically contain 40 to 60 parts of a filler, such as carbon black, 2 phr to 5 phr of zinc oxide, 1 phr to 3 phr of stearic acid, 1 phr to 2 phr of a phenolic type resin, 8 phr to 20 phr of an aromatic oil and 1 to 2 phr of an antioxidant. The washer or gasket will normally be sulfur-cured utilizing a conventional sulfur cure package that contains from about 1.2 phr to 2.2 phr of sulfur and that preferably contains from 1.6 phr to 1.8 phr of sulfur.

Brake diaphragms having improved abrasion resistance and improved resistance to compression set can also be made with SBR made by the FIM process. Air-operated diaphragm brakes are comprised of a service brake chamber and a spring brake chamber which are joined in tandem. An elastomeric diaphragm known as the service brake diaphragm is mounted within the service brake chamber and a second elastomeric diaphragm known as the spring diaphragm is suspended within the spring brake chamber. Both of these types of brake diaphragms will exhibit improved physical properties if manufactured using the technique of this invention. U.S. Pat. Nos. 5,345,858 and 5,002,164 describe service brake diaphragms and spring diaphragms in greater detail and the teachings of these patents are hereby incorporated by reference in their entirety. The brake diaphragm will typically contain 100 percent SBR as the rubber component. However, small amounts of other elastomers can be blended into the SBR. For instance, nitrile rubber can be added to attain improved oil resistance. The brake diaphragm rubber composition will also typically contain 45 phr to 75 phr of a filler (typically, carbon black) and 1 phr to 2 phr of an antioxidant. The brake diaphragm rubber will preferably contain 55 phr to 70 phr of carbon black as the filler. The brake gasket will normally be sulfur-cured utilizing a conventional sulfur cure package that contains from about 1.2 phr to 2.2 phr of sulfur and that preferably contains from 1.6 phr to 1.8 phr of sulfur.

It is highly beneficial to manufacture windshield wiper blades for automotive, aviation or marine applications using SBR made by the FIM process. This is because much better abrasion resistance will be attained. This results in the windshield wiper blade having a longer useful service life. Simple windshield wiper blades can be made by extruding SBR into the desired form and curing it to produce the wiper blade. Typically, some ethylene-propylene-diene monomer rubber (EPDM) will be blended into the SBR to improve ozone resistance and solvent resistance. Such simple windshield wiper blades will contain 30 phr to 100 phr of the SBR and 0 phr to 70 phr of EPDM. It is more typical for such simple blade constructions to contain 50 phr to 70 phr of the SBR and 30 phr to 50 phr of EPDM. It is generally preferable for such simple blade constructions to contain from 55 phr to 65 phr of the SBR and 35 phr to 45 phr of EPDM.

A more sophisticated and preferred windshield wiper design is shown is FIG. 1. This preferred windshield wiper design is comprised of a base section 2 consisting of a head 21, a body 23 and a connecting neck 22 interconnecting the head 21 and the body 23; a turning section 3 having a substantially triangular cross section; a neck section 4 interconnecting the base section 2 and the turning section 3; and a lip section 5 extending from the ridge of the turning section 3 in the form of a thin strip. In the windshield wiper blades of this preferred embodiment, the lip section 5 will be comprised of the SBR rubber made by the FIM process. In this design, it is highly preferred for the neck section 4 to be formed of EPDM rubber due to its excellent ozone resistance. For more details regarding this general type of windshield wiper blade and on manufacturing it by extrusion molding, see U.S. Pat. No. 4,669,144. The teachings of U.S. Pat. No. 4,669,144 are incorporated by reference herein in their entirety.

In another embodiment of this invention, at least the lip-section of a conventional wiper blade is coated with the SBR made by the FIM process. This is done by applying a solution of the SBR and a curative to at least the lip section of the windshield wiper blade. Such a solution can be made by dissolving the SBR and a curing agent in a mixture of methyl ethyl ketone and toluene containing about 47.5 percent methyl ethyl ketone. After the SBR solution is applied to the wiper blade, it is heated to a temperature of about 80° C. for a period of time which is sufficient to evaporate the solvent and to cure the SBR. This technique is described in greater detail in U.S. Pat. No. 4,045,838; the teachings of which are incorporated herein by reference in their entirety.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

Control

In this experiment, an SBR latex was synthesized by copolymerizing 1,3-butadiene monomer and styrene monomer by a standard continuous process. This procedure was conducted in a pilot plant which consisted of a series of five polymerization reactors. Each of the reactors used in this procedure were 30-gallon stirred reactors which were connected to operate in series (the reactor chain had a total chain volume of 150 gallons). The reactor chain was continuously operated at an actual running rate of 18.53 gallons per hour which provided an actual reaction time of 8.1 hours.

The monomers were fed into the first reactor at a rate of 48.9 pounds per hour. The monomer charge employed contained 69 weight percent 1,3-butadiene and 31 weight percent styrene. An activator solution, a soap solution, a scavenger solution, a modifier and an initiator were also continuously changed into the first reactor.

The activator solution was an aqueous solution containing 0.67 percent sodium ferric ethylenediaminetetraacetate. It was charged into the first reactor at a rate which was sufficient to maintain a 0.026 phm level of sodium ferric ethylenediaminetetraacetate.

The soap solution contained 96.79 percent water, 0.19 percent sodium hydroxide, 0.20 percent potassium hydroxide, 0.59 percent of the potassium soap of disproportionated wood rosin, 1.10 percent hydrogenated mixed tallow fatty acids, 0.89 percent of the potassium soap of disproportionated tall oil rosin, 0.18 percent of the sodium salt of a condensed naphthalene sulfonic acid, 0.03 percent tetrapotassium pyrophosphate, 0.02 percent sodium formaldehyde sulfoxylate and 0.01 percent sodium hydrosulfite. The soap system solution was charged into the first reactor at a rate which was sufficient to maintain a 0.341 phm level of sodium hydroxide, a 0.374 phm level of potassium hydroxide, a 1.088 phm level of the potassium soap of disproportionated wood rosin, a 2.022 phm level of hydrogenated mixed tallow fatty acids, a 1.631 phm level of the potassium soap of disproportionated tall oil rosin, a 0.335 phm level of the sodium salt of a condensed naphthalene sulfonic acid, a 0.057 phm level of tetrapotassium pyrophosphate, a 0.034 phm level of sodium formaldehyde sulfoxylate and a 0.019 phm level of sodium hydrosulfite.

The scavenger solution contained 99.31 percent water, 0.096 percent sodium hydroxide and 0.60 percent sodium hydrosulfite. The scavenger solution was charged into the first reactor at a rate which was sufficient to maintain a 0.004 phm level of sodium hydroxide and a 0.026 phm level of sodium hydrosulfite (the total level of sodium hydrosulfite was 0.045 phm).

The modifier charged into the first reactor was t-dodecyl mercaptan. It was charged into the reactor at a rate of 0.137 phm. The initiator charged into the first reactor was pinane hydroperoxide and it was charged at a rate of 0.087 phm.

In this procedure, the polymerization was terminated by adding a mixture of diethylhydroxylamine and sodium dimethyldithiocarbamate to the latex as a shortstop after it exited the fifth reactor. The latex made by this procedure was stable. However, stable latices could not be made if the level of soap added to the first reactor was reduced.

EXAMPLE 2

In this experiment, the equipment and procedure described in Example 1 were repeated except that the monomer charge was split with some of the monomer being charged into the third reactor. In this procedure, 29.6 pounds per hour of monomer were continuously charged into the first reactor and 19.1 pounds per hour of monomer were continuously charged into the third reactor. This allowed for the total level of soap to be reduced by about 40 percent.

In this experiment, the soap solution charged into the first reactor contained 98.0 percent water, 0.25 percent potassium hydroxide, 0.13 percent potassium chloride, 0.0 percent of the potassium soap of disproportionated wood rosin, 1.18 percent hydrogenated mixed tallow fatty acids, 0.28 percent of the potassium soap of disproportionated tall oil rosin, 0.12 percent of the sodium salt of a condensed naphthalene sulfonic acid, 0.02 percent tetrapotassium pyrophosphate, 0.02 percent sodium formaldehyde sulfoxylate and 0.01 percent sodium hydrosulfite. The soap system solution was charged into the first reactor at a rate which was sufficient to maintain a 0.435 phm level of potassium hydroxide, a 0.230 phm level of potassium chloride, a 0.0 phm level of the potassium soap of disproportionated wood rosin, a 2.076 phm level of hydrogenated mixed tallow fatty acids, a 0.492 phm level of the potassium soap of disproportionated tall oil rosin, a 0.206 phm level of the sodium salt of a condensed naphthalene sulfonic acid, a 0.035 phm level of tetrapotassium pyrophosphate, a 0.035 phm level of sodium formaldehyde sulfoxylate and a 0.019 phm level of sodium hydrosulfite.

In this procedure, 0.503 phm of an aqueous solution of Witconate® 1223L, the sodium salt of a linear alkylbenzene sulfonic acid (from Witco Chemicals), was also charged into the first reactor as a secondary surfactant. The level of pinane hydroperoxide initiator was also increased to 0.110 phm.

The SBR latex made utilizing this procedure proved to be stable. The level of residual soap in the SBR recovered from the latex was also reduced.

While certain representative embodiments and details have been shown for the purpose of illustrating the subject invention, it will be apparent to those skilled in this art that various changes and modifications can be made therein without departing from the scope of the subject invention.

What is claimed is:

1. A windshield wiper blade which is comprised of a head, a body, a neck section, a turning section and a lip section; wherein the lip section is comprised of styrene-butadiene rubber which is made by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex.

2. A windshield wiper blade as specified in claim 1 wherein the neck section is comprised of EPDM rubber.

3. A windshield wiper blade which is comprised of a head, a body, a neck section, a turning section and a lip section; wherein the lip section is coated with styrene-butadiene rubber which is made by a process which comprises (1) charging water, a soap system, a free radical generator, 1,3-butadiene monomer and styrene monomer into a first polymerization zone; (2) allowing the 1,3-butadiene monomer and the styrene monomer to copolymerize in the first polymerization zone to a monomer conversion which is within the range of about 15 percent to about 40 percent to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50 percent is attained to produce the latex of styrene-butadiene rubber; and (6) recovering the styrene-butadiene rubber from the latex.

4. A windshield wiper blade as specified in claim 3 wherein the 1,3-butadiene monomer and the styrene monomer are copolymerized in step (2) to a monomer conversion which is within the range of about 17 percent to about 35 percent.

5. A windshield wiper blade as specified in claim 4 wherein the quantity of soap employed is less than about 3.5 phm and wherein the weight ratio of fatty acid soaps to rosin acid soaps is within the range of about 50:50 to 90:10.

6. A windshield wiper blade as specified in claim 5 wherein from about 20 weight percent to about 50 weight percent of the total quantity of 1,3-butadiene monomer and styrene monomer charged is charged into the second polymerization zone, based upon the total quantity of 1,3-butadiene monomer and styrene monomer charged into the first polymerization zone and the second polymerization zone.

7. A windshield wiper blade as specified in claim 6 wherein the monomer charge contains from about 10 weight percent to about 40 weight percent styrene and from about 60 weight percent to about 90 weight percent 1,3-butadiene.

8. A windshield wiper blade as specified in claim 7 wherein the copolymerization is conducted at a temperature which is within the range of about 35° F. to about 65° F.

9. A windshield wiper blade as specified in claim 8 wherein the copolymerization in step (5) is allowed to continue until a monomer conversion which is within the range of about 50 percent to about 68 percent is attained.

10. A windshield wiper blade as specified in claim 8 wherein the quantity of soap employed is within the range of about 2.5 phm to about 3.2 phm.

11. A windshield wiper blade as specified in claim 10 wherein the 1,3-butadiene monomer and the styrene monomer are copolymerized in step (2) to a monomer conversion which is within the range of about 20 percent to about 30 percent.

12. A windshield wiper blade as specified in claim 11 wherein from about 30 weight percent to about 45 weight percent of the total quantity of 1,3-butadiene monomer and styrene monomer charged is charged into the second polymerization zone, based upon the total quantity of 1,3-butadiene monomer and styrene monomer charged into the first polymerization zone and the second polymerization zone.

13. A windshield wiper blade as specified in claim 12 wherein the monomer charge contains from about 20 weight percent to about 30 weight percent styrene and from about 70 weight percent to about 80 weight percent 1,3-butadiene.

14. A windshield wiper blade as specified in claim 13 wherein the copolymerization is conducted at a temperature which is within the range of about 40° F. to about 60° F.

15. A windshield wiper blade as specified in claim 14 wherein the free radical generator is a peroxygen compound.

16. A windshield wiper blade as specified in claim 14 wherein the free radical generator is selected from the group consisting of potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, 2,2-bis-(t-butylperoxy)butane, ethyl 3,3-bis(t-butylperoxy)butyrate and 1,1-di-(t-butylperoxy)cyclohexane.

17. A windshield wiper blade as specified in claim 14 wherein the free radical generator is selected from the group consisting of potassium persulfate ammonium persulfate and pinane hydroperoxide.

18. A windshield wiper blade as specified in claim 17 wherein from about 35 weight percent to about 42 weight percent of the total quantity of 1,3-butadiene monomer and styrene monomer charged is charged into the second polymerization zone, based upon the total quantity of 1,3-butadiene monomer and styrene monomer charged into the first polymerization zone and the second polymerization zone.

19. A windshield wiper blade as specified in claim 18 wherein the monomer charge contains from about 24 weight percent to about 28 weight percent styrene and from about 72 weight percent to about 76 weight percent 1,3-butadiene.

20. A windshield wiper blade as specified in claim 19 wherein the copolymerization is conducted at a temperature which is within the range of about 45° F. to about 55° F. and wherein the total level of soap present is within the range of about 2.7 phm to 2.9 phm.

21. A windshield wiper blade as specified in claim 18 wherein the quantity of soap employed is within the range of about 2.6 phm to about 3.0 phm.

\* \* \* \* \*